United States Patent
Aranda

(10) Patent No.: US 11,747,954 B1
(45) Date of Patent: Sep. 5, 2023

(54) SYSTEMS AND METHODS FOR ORGANIZING CONTENTS IN XR ENVIRONMENTS

(71) Applicant: Samsung Electronics Company, Ltd., Gyeonggi-do (KR)

(72) Inventor: Alejandro Aranda, Vancouver (CA)

(73) Assignee: SAMSUNG ELECTRONICS COMPANY, LTD., Suwon (KR)

( * ) Notice: Subject to any disclaimer, the term of this patent is extended or adjusted under 35 U.S.C. 154(b) by 0 days.

(21) Appl. No.: 17/692,017

(22) Filed: Mar. 10, 2022

(51) Int. Cl.
*G06F 3/04815* (2022.01)
*G02B 27/01* (2006.01)
*G06T 19/00* (2011.01)
*G06F 3/01* (2006.01)

(52) U.S. Cl.
CPC ....... *G06F 3/04815* (2013.01); *G02B 27/017* (2013.01); *G06F 3/011* (2013.01); *G06T 19/006* (2013.01)

(58) Field of Classification Search
CPC ........ G06F 3/0346; G06F 3/011; G06F 3/012; G06F 3/017; G06F 2119/14; G06F 30/20; G06F 3/013; G06F 3/0213; G06F 3/0338; G06F 3/03543; G06F 3/03548; G06F 3/03549; G06F 3/04815; G06F 3/04842; G06F 3/04845; G06F 3/04883; G06F 2203/04102; G06F 2203/04104; G06F 2203/04105; G06F 3/04144; G06F 3/04166
See application file for complete search history.

(56) References Cited

U.S. PATENT DOCUMENTS

| | | |
|---|---|---|
| 6,157,383 A | 12/2000 | Loop |
| 6,184,884 B1 | 2/2001 | Nagahara |
| 6,266,098 B1 | 7/2001 | Cove |
| 6,414,677 B1 | 7/2002 | Robertson |
| 7,350,158 B2 | 3/2008 | Yamaguchi |
| 7,562,312 B2 | 7/2009 | Rochford |
| 7,675,514 B2 | 3/2010 | Ni |
| 2007/0277112 A1* | 11/2007 | Rossler ............... G06F 3/04815 715/764 |

(Continued)

FOREIGN PATENT DOCUMENTS

KR 10-1609388 3/2016

*Primary Examiner* — Rayeez R Chowdhury
(74) *Attorney, Agent, or Firm* — Baker Botts L.L.P.

(57) ABSTRACT

In one embodiment, a method includes rendering a first sequence of image frames for displays of the extended reality (XR) display device in XR environment, wherein the first sequence of images portrays a virtual content organizer with multiple user-interactable elements corresponding to a first respective multiple operations, wherein the virtual content organizer is in a first pose, wherein a first subset of user-interactable elements of multiple user-interactable elements is selectable from the first pose, receiving one or more first gesture inputs associated with a first manipulation of the virtual content organizer along six degrees of freedom from the first pose to a second pose, rendering a second sequence of image frames, wherein the second sequence of images portrays the virtual content organizer in the second pose, receiving a selection of a particular user-interactable element from a second subset of user-interactable elements in a second pose, and executing the particular operation.

20 Claims, 13 Drawing Sheets

(56) References Cited

U.S. PATENT DOCUMENTS

| | | | |
|---|---|---|---|
| 2009/0125842 A1* | 5/2009 | Nakayama | H04N 21/4312 |
| | | | 715/835 |
| 2018/0061011 A1* | 3/2018 | Kim | H04N 5/23238 |
| 2019/0384408 A1* | 12/2019 | Iyer | G02B 27/017 |
| 2020/0038119 A1* | 2/2020 | Geri | G09G 3/002 |
| 2021/0004146 A1* | 1/2021 | Linville | G06F 3/0304 |
| 2022/0350401 A1* | 11/2022 | Gutensohn | G06F 3/013 |
| 2022/0399761 A1* | 12/2022 | Leppanen | H02J 50/20 |

* cited by examiner

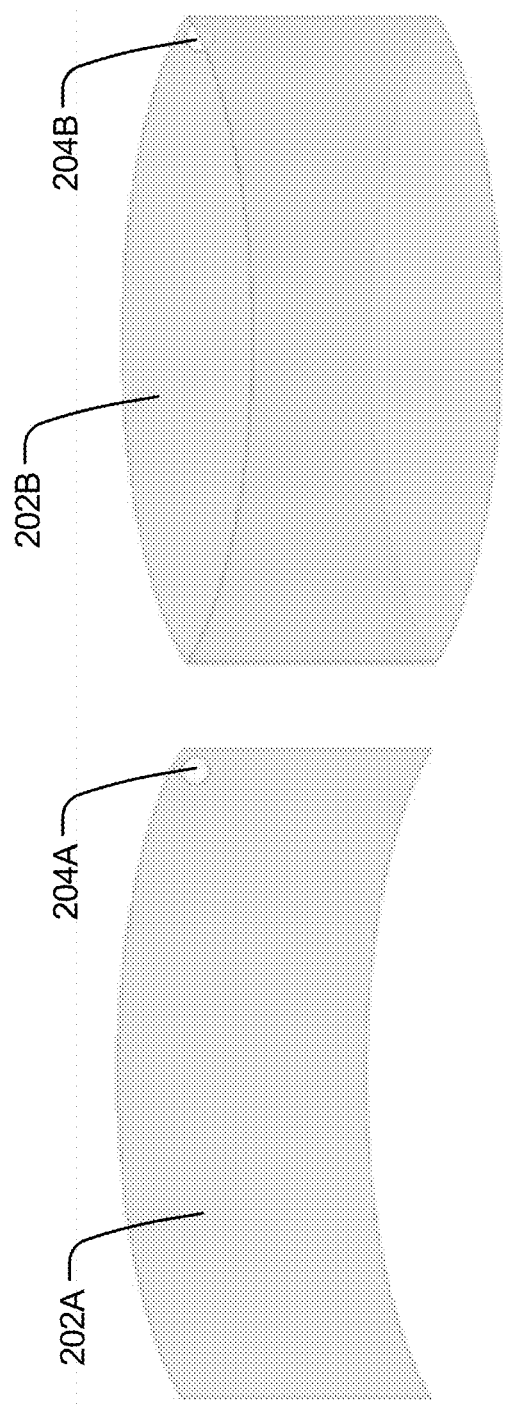

SYSTEMS AND METHODS FOR ORGANIZING CONTENTS IN XR ENVIRONMENTS

TECHNICAL FIELD

This disclosure relates generally to database and file management within network environments, and in particular relates to organizing contents in extended reality (XR) environments.

BACKGROUND

As technologies evolve into extended reality (XR) (e.g., virtual reality (VR), augmented reality (AR), merged reality (MR)) field, a growing number of users incorporate these technologies in their daily lives. The habit that people use two-dimensional devices such as smartphones and tablets to obtain information is gradually transiting to three-dimensional (3D) information manipulations through devices such as a XR head-mounted display (HMD). This trend leads to increasing XR user-end applications and various ways to display diverse information compatible with XR environments.

The users can get immersive experiences through XR technologies in almost every industry, such as architecture, automotive industry, sports training, real estate, mental health, medicine, health care, retail, space travel, design, engineering, interior design, television, and film, media, advertising, marketing, libraries, education, news, music, work, and travel.

The XR field continues to grow, and the relentless development of XR technologies and features has been constantly introduced to the users. It is becoming more complex for users to interact with content and application based on the new development. Therefore, accessing and managing numerous information more efficiently and practically becomes more pivotal to enhance user experiences. It is crucial to provide users with an intuitive, simple, and effective way to manage information and content in XR environments to improve efficiency.

Most of the patterns and interfaces used to interact with applications and contents are a legacy from computers and mobile devices. However, these patterns are unintuitive and difficult to work within the XR environments and may affect the immersive user experiences in the XR environments.

BRIEF DESCRIPTION OF THE DRAWINGS

FIG. 2A illustrates an example XR environment.

FIG. 2B illustrates another example XR environment.

DESCRIPTION OF EXAMPLE EMBODIMENTS

Extended Reality (XR) System Overview

Figure 1:
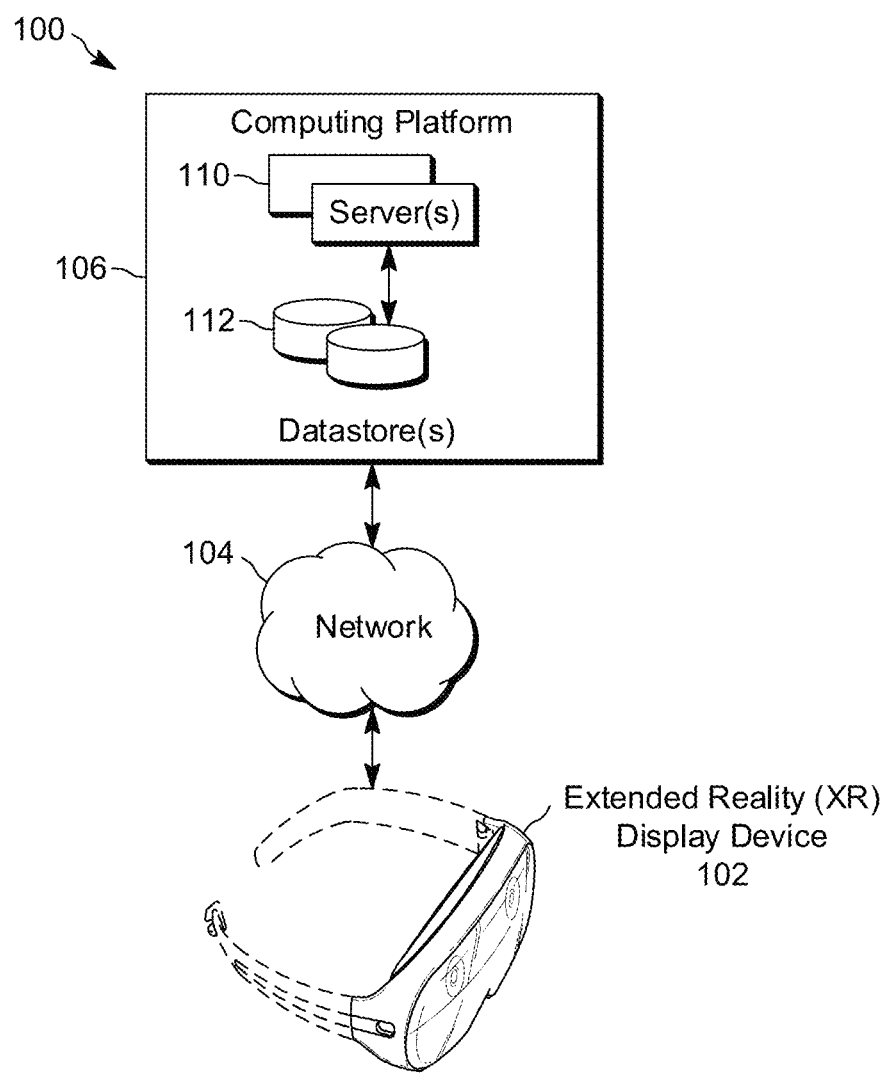
FIG. 1 illustrates an example extended reality (XR) system.

FIG. 1 illustrates an example extended reality (XR) system 100 that may be suitable for selectively re-projecting depth maps based on image and depth data and pose data updates, in accordance with presently disclosed embodiments. In particular embodiments, the XR system 100 may include an extended reality (XR) display device 102, a network 104, and a computing platform 106. In particular embodiments, a user may wear the XR display device 102 that may display visual extended reality content to the user. The XR display device 102 may include an audio device that may provide audio extended reality content to the user. In particular embodiments, the XR display device 102 may include one or more cameras which can capture images and videos of environments. The XR display device 102 may include an eye tracking system to determine the vergence distance of the user. In particular embodiments, the XR display device 102 may include a lightweight head-mounted display (HMD) (e.g., goggles, eyeglasses, spectacles, a visor, and so forth). In particular embodiments, the XR display device 102 may also include a non-HMD device, such as a lightweight handheld display device or one or more laser projecting spectacles (e.g., spectacles that may project a low-powered laser onto a user's retina to project and display image or depth content to the user). In particular embodiments, the network 104 may include, for example, any of various wireless communications networks (e.g., WLAN, WAN, PAN, cellular, WMN, WiMAX, GAN, 6LowPAN, and so forth) that may be suitable for communicatively coupling the XR display device 102 to the computing platform 106.

In particular embodiments, the computing platform 106 may include, for example, a standalone host computing system, an on-board computer system integrated with the XR display device 102, a mobile device, or any other hardware platform that may be capable of providing extended reality content to the XR display device 102. In particular embodiments, the computing platform 106 may include, for example, a cloud-based computing architecture (including one or more servers 110 and data stores 112) suitable for hosting and servicing XR applications or experiences executing on an XR electronic device 102. For example, in particular embodiments, the computing platform 106 may include a Platform as a Service (PaaS) architecture, a Software as a Service (SaaS) architecture, and an Infrastructure as a Service (IaaS), or other similar cloud-based computing architecture.

Organizing Contents in XR Environments

Managing and manipulating massive applications and contents in XR environments may require a more immersive, efficient, and intuitive way for an XR display device (e.g., head-mounted display (HMD)) user to interact compared to the traditional two-dimensional (2D) display devices such as smartphones and tablets. As XR technologies develop, contents in almost every industry can be discovered and accessed and thus become more complex and diverse. Most three-dimensional (3D) object manipulations inherent patterns and user interfaces from approaches to managing the 2D display devices contents, for example, manipulating objects or contents in an XR environment through a handheld device, making user interaction less intuitive and frustrating user immersive XR experiences. Therefore, it is critical to provide a method of organizing, prioritizing, and presenting content to users efficiently without sacrificing immersive user experiences in the XR environment. To address the aforementioned problems, the embodiments disclosed herein use hand gestures to easily manipulate a virtual content organizer to manage and access contents in the XR environment intuitively.

Figure 3B:
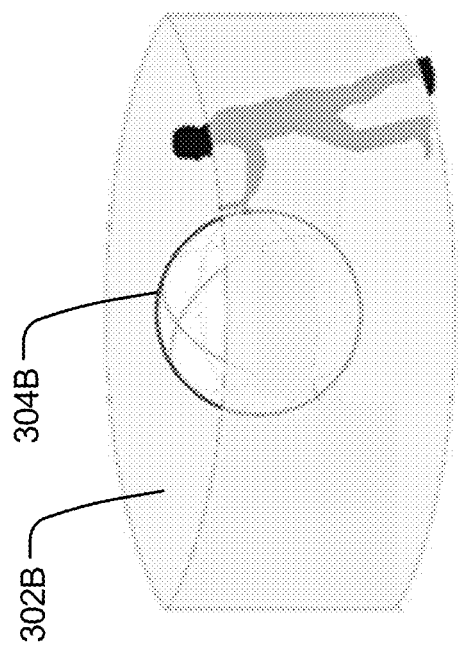
FIG. 3B illustrates an example interacting with the virtual content organizer of the XR environment.
Figure 3A:
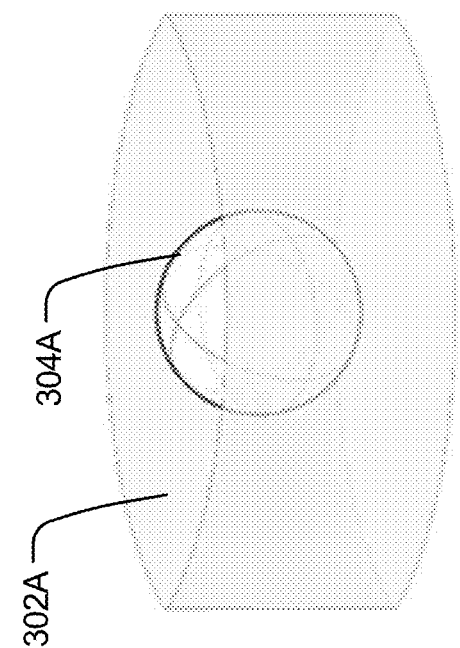
FIG. 3A illustrates an example virtual content organizer of the XR environment.

In particular embodiments, the XR system 100 may render an XR environment by an XR display device 102. For example, as depicted in FIG. 2A, the XR environment may be an open environment 202A (e.g., AR environment, MR environment), and the XR display device 102 may render a user-interactable icon 204A within the open environment 202A. As an example, and not by way of limitation, FIG. 2B illustrates a fully enclosed XR environment 202B (e.g., VR environment). The XR display device 102 may render a user-interactable icon 204B within the fully enclosed XR environment 202B. The user-interactable icons 204A and 204B are selectable to launch and activate a virtual content organizer in the XR environment for XR users to interact with. As depicted in FIG. 3A, the virtual content organizer may be a spherical interface 304A and may be extended within the XR environment 302A and ready for the XR users to interact with. As depicted in FIG. 3B, the XR display device 102 may receive hand gestures of users for manipulation of the spherical interface 304B by rotating the sphere in all directions. The virtual content organizer may be customizable with user-defined settings. The XR display device 102 may render a sequence of image frames with user-interactable elements created and organized by the user (e.g., scrolling contents, adding contents, removing contents, etc.). As used herein, "user-interactable elements" may refer to a list of categories classified by users, by default, or by machine learning technologies (e.g., games, music, business, education, most used applications, recommendations, etc.). "User-interactable elements" may also refer to a group of particular applications and contents under a particular category (e.g., reminders, calculator, calendar, etc., under the business category). After the XR display device 102 displaying a first subset of the user-interactable elements, users may interact with the virtual content organizer by manipulating the spherical interface of the virtual content organizer using gestures along six degrees of freedom (e.g., translation, rotation, scaling) to discover contents and obtain a second subset of the user-interactable elements. The user may navigate content according to various criteria (e.g., numeric navigation, alphabetical navigation, category-based navigation, time-based navigation, location-based navigation, etc.). The embodiments disclosed herein may use "resizing" and "scaling" interchangeably. As an example and not by way of limitation, resizing the spherical interface of the virtual content organizer may comprise, by using user gestures, scaling the spherical interface to a user-preferred size that is easier to manipulate for a particular user. For example, adult users may require a more extensive user interface (UI), and children users may need a smaller user interface. Once the user finds the desired content, the user may select such content to activate the desired content (e.g., play music).

In particular embodiments, once the content is activated, the XR display device 102 may render the spherical interface of the virtual content organizer reduced into the user-interactable icons 204A or 204B, and the virtual content organizer is set aside for users to experience the total immersion of the content selected. While being set aside, the virtual content organizer is always available if the user chooses to select new content, access a new environment, or allow multitasking (e.g., answering a call while inside a gaming environment). Although this disclosure describes the virtual content organizer in a particular manner, this disclosure contemplates the virtual content organizer in any suitable manner.

Certain technical challenges exist for providing an immersive, efficient, and intuitive approach to organizing, browsing, and selecting content for the XR environment. One technical challenge may include rendering the XR environment a three-dimensional (3D) user interface. The solution presented by the embodiments disclosed herein to address this challenge may be rendering a sequence of image frames of the XR environment that portrays a spherical virtual content organizer with a plurality of user-interactable elements corresponding to a first respective plurality of operations. Another technical challenge may include manipulating the virtual content organizer to navigate and access user desired contents. The solution presented by the embodiments disclosed herein to address this challenge may be receiving one or more gesture inputs associated with manipulating the virtual content organizer along one or more of the six degrees of freedom from a first pose to a second pose of the virtual content organizer.

Certain embodiments disclosed herein may provide one or more technical advantages. A technical advantage of the embodiments may include being compatible with any XR devices or format within XR environments. Another technical advantage of the embodiments may include enabling easy navigation and instant access to user desired contents and applications. Another technical advantage of the embodiments may include generating machine learning-based collections of contents according to user preferences. Another technical advantage of the embodiments may include proving the ability to multitask while in an immersive environment. Certain embodiments disclosed herein may provide none, some, or all of the above technical advantages. One or more other technical benefits may be readily apparent to one skilled in the art in view of the figures, descriptions, and claims of the present disclosure.

In particular embodiments, the XR display device 102 may render a first sequence of image frames of the XR environment for one or more displays of the XR display device. The first sequence of images may portray a virtual content organizer with a plurality of user-interactable elements corresponding to a first respective plurality of operations. The virtual content organizer is approximately spherical. The virtual content organizer may be in a first pose, wherein a first sub set of user-interactable elements of the plurality of user-interactable elements is selectable from the first pose. The virtual content organizer may be operable for users to manipulate within the XR environment with six degrees of freedom. As an example and not by way of limitation, the XR display device 102 may render the virtual content organizer with user-interactable elements hovering over the surface of the sphere of the virtual content organizer. As an example and not by way of limitation, the XR display device 102 may render the virtual content organizer with user-interactable elements laying on the surface of the sphere of the virtual content organizer like a globe.

Figure 4:
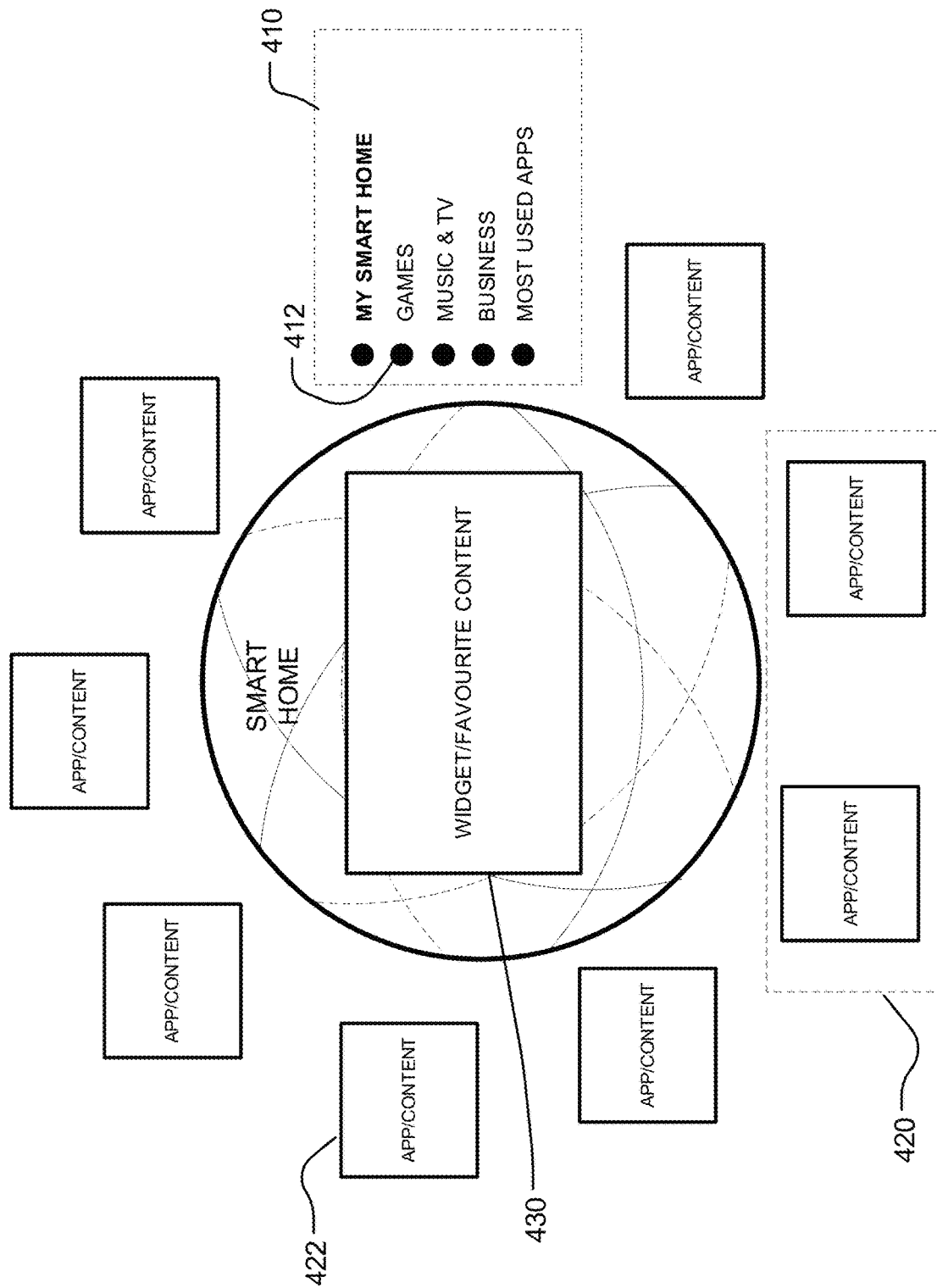
FIG. 4 illustrates an example first pose of the virtual content organizer.

FIG. 4 illustrates an example first pose of the virtual content organizer. The XR display device 102 may render the first sequence of frames that may portray the virtual content organizer 400 of the XR environment in the first pose. The virtual content organizer 400 may be spherical. The XR display device 102 may render the virtual content organizer with the first subset of user-interactable elements 410, 420, and 430. The user-interactable elements 410 of the first subset of user-interactable elements may refer to a list of category type user-interactable elements 410 for classifying the contents in the XR environment. The list of categories may be defined by the user, be defined by default, or be automatically generated by the XR display device 102 through a machine learning process by studying historical data saved by the XR display device 102. The user-interactable elements 420 of the first subset of user-interactable elements may refer to a group of content and application type user-interactable elements 420 under a particular category type. The content and application type user-interactable elements 420 may be defined by the user, by default, or be automatically generated by XR display device 102 through the machine learning process through studying historical data saved by the XR display device 102. The user-interactable elements 430 of the first subset of user-interactable elements may display selected contents. In another example, the user-interactable elements 430 of the first subset of user-interactable elements may be a group of user favorite contents and application type user-interactable elements automatically generated by XR display device 102 through the machine learning process through studying historical data saved by the XR display device 102. In particular embodiments, the list of category type user-interactable elements 410 and content and application type user-interactable elements 420 and 430 may be selectable in the first pose. As an example and not by way of limitation, the XR display device 102 may execute a selection of the user-interactable elements by receiving gesture input, voice input, or other intuitive input types compatible with the XR environment. The user-interactable elements 410, 420, and 430 may correspond to a first respective plurality of operations. As used herein, "first respective plurality of operations" may refer to operations that may be executed by selecting user-interactable elements at an active status of the virtual content organizer. The active status may refer to a extended spherical interface of the virtual content organizer compared to a launcher mode, for example, the user-interactable icon 204B as depicted in FIG. 2B. For example, the user-interactable element 412 may correspond to the operation of navigating the contents and applications under the category type user-interactable element 412. For example, the user-interactable element 422 may correspond to executing an application (e.g., launch a game).

In particular embodiments, the XR display device 102 may receive one or more first gesture inputs associated with a first manipulation of the virtual content organizer along one or more of the six degrees of freedom from the first pose to a second pose. The first manipulation of the virtual content organizer along one or more of the six degrees of freedom from the first pose to the second pose comprises one or more of translating the virtual content organizer, rotating the virtual content organizer, or resizing the virtual content organizer. As an example and not by way of limitation, the XR display device 102 may transport the virtual content organizer to any coordinate within the XR environment per receiving the first gestures input when the user needs to arrange space of the XR environment. As an example and not by way of limitation, the XR display device 102 may resize the virtual content organizer per receiving another first gestures inputs to modify the size of the virtual content organizer. The modified organizer size may be more friendly for the user to interact with (e.g., kids need smaller sizes). As used herein, "first gesture input" may refer to a set of gestures (e.g., point, tap, throw, drag, swipe, wave, etc.) that are programmed to manipulate transformations of the virtual content organizer along six degrees of freedom.

In particular embodiments, the XR display device 102 may render, for the one or more displays of the XR display device, a second sequence of image frames of the XR environment, wherein the second sequence of images portrays the virtual content organizer in the second pose, wherein a second subset of user-interactable elements of the plurality of elements is selectable from the second pose.

Figure 5:
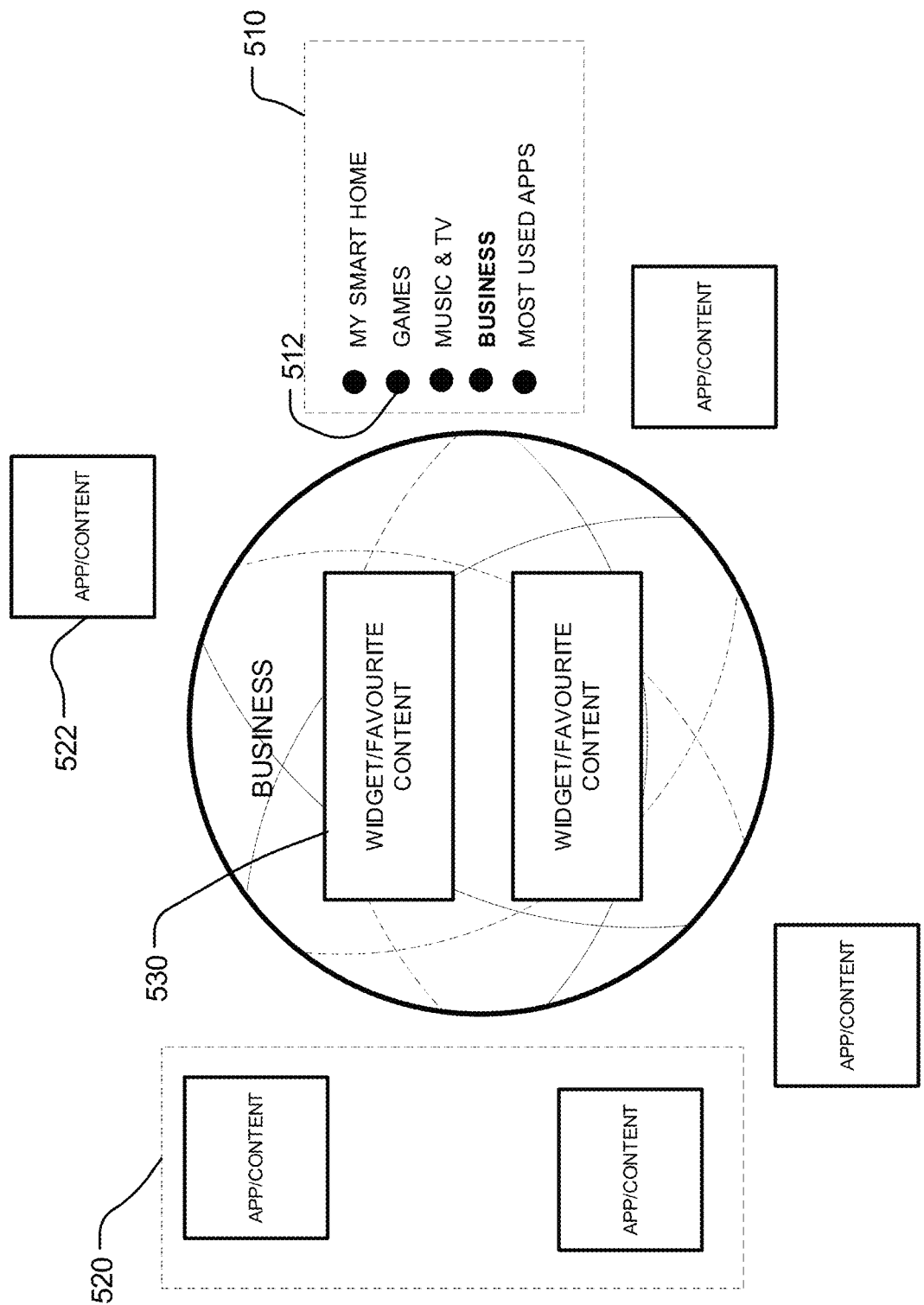
FIG. 5 illustrates an example second pose of the virtual content organizer.

FIG. 5 illustrates an example second pose of the virtual content organizer. The XR display device 102 may render the second sequence of frames that may portray a virtual content organizer 500 of the XR environment in the second pose. The virtual content organizer 500 may be spherical. The XR display device 102 may render the virtual content organizer with the second subset of user-interactable elements 510, 520, and 530. The user-interactable elements 510 of the second subset of user-interactable elements may refer to a list of category type user-interactable elements 410 for classifying the contents in the XR environment. The list of categories may be defined by the user, be defined by default, or be automatically generated by the XR display device 102 by the machine learning process through studying historical data saved by the XR display device 102. The user-interactable elements 520 of the second subset of user-interactable elements may refer to a group of content and application type user-interactable elements 520 under a particular category type. The content and application type user-interactable elements 520 may be defined by the user, by default, or be automatically generated by the XR display device 102 through the machine learning process through studying historical data saved by the XR display device 102. The user-interactable elements 530 of the second subset of user-interactable elements may display selected contents. In another example, the user-interactable elements 530 of the second subset of user-interactable elements may be a group of user favorite contents and application type user-interactable elements automatically generated by the XR display device 102 through the machine learning process through studying historical data saved by the XR display device 102. In particular embodiments, the list of category type user-interactable elements 510 and content and application type user-interactable elements 520 and 530 may be selectable in the second pose. As an example and not by way of limitation, the XR display device 102 may execute a selection of the user-interactable elements by receiving audio input, gesture input, or other intuitive input types that are compatible with the XR environment. The user-interactable elements 510, 520, and 530 may correspond to the first respective plurality of operations. As used herein, "first respective plurality of operations" may refer to operations that may be executed by selecting user-interactable elements at an active status of the virtual content organizer. The active status mat refers to a extended spherical interface of the virtual content organizer compared to a launcher mode, for example, the user-interactable icon 204B as depicted in FIG. 2B. For example, the user-interactable element 512 may correspond to the operation of navigating the contents and applications under the category type user-interactable element 512. For example, the user-interactable element 522 may correspond to executing an application (e.g., launch a game).

Figure 6B:
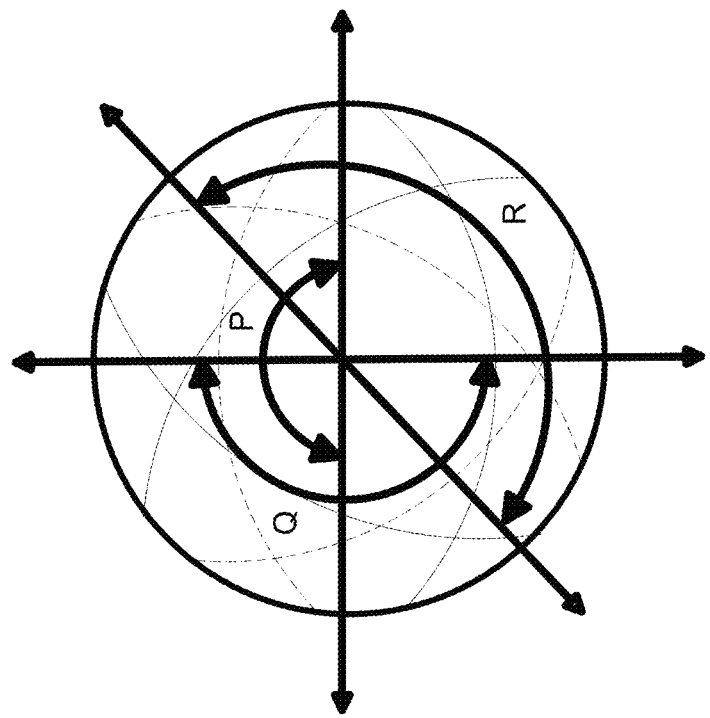
FIG. 6B illustrates another example manipulation of the virtual content organizer within the XR environment with six degrees of freedom.
Figure 6A:
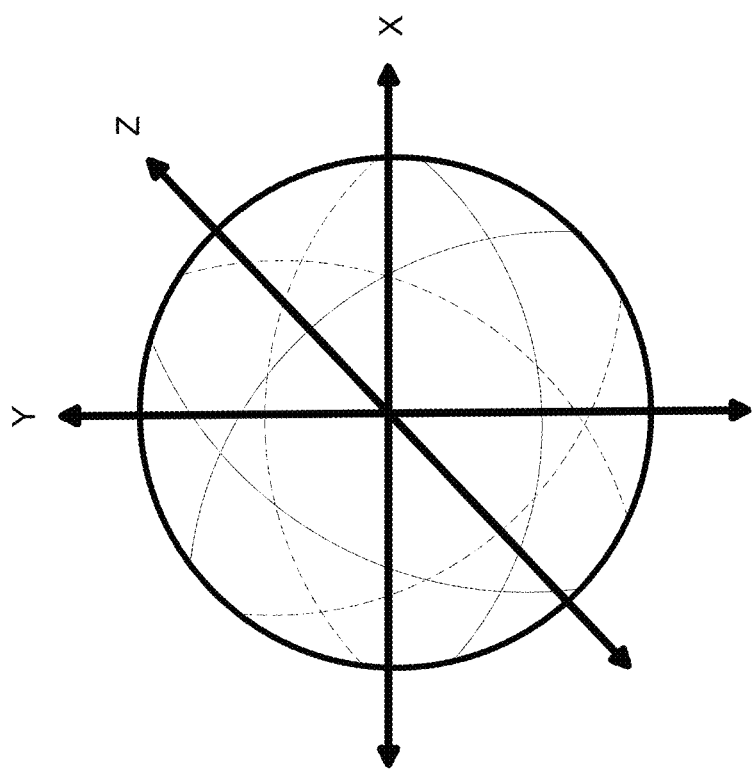
FIG. 6A illustrates an example manipulation of the virtual content organizer within the XR environment with six degrees of freedom.

FIG. 6A illustrates an example manipulation of the virtual content organizer within the XR environment with six degrees of freedom. As an example and not by way of limitation, the first manipulation of the virtual content organizer may comprise translating the virtual content organizer forward and back, up and down, or left and right along X, Y, or Z axes, respectively.

FIG. 6B illustrates another example manipulation of the virtual content organizer within the XR environment with six degrees of freedom. As an example and not by way of limitation, the first manipulation of the virtual content organizer may comprise rotating the virtual content organizer along P, Q, or R (pitch, yaw, or roll axes), respectively.

Figure 7B:
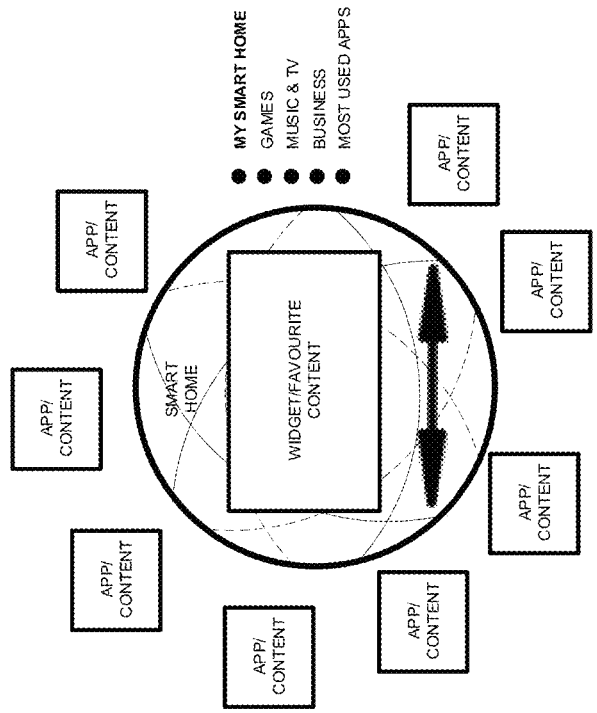
FIG. 7B illustrates another example manipulation of the virtual content organizer from the first pose to the second pose.
Figure 7A:
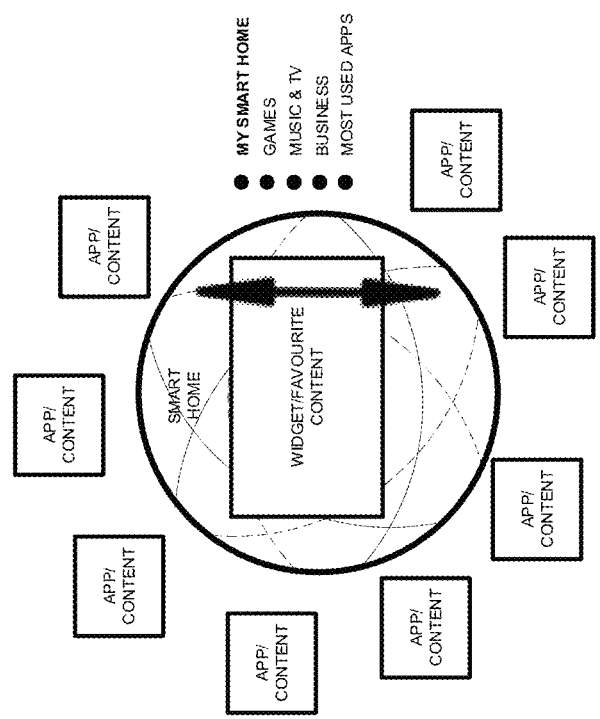
FIG. 7A illustrates an example manipulation of the virtual content organizer from the first pose to the second pose.

FIG. 7A illustrates an example manipulation of the virtual content organizer from the first pose to the second pose. The XR display device 102 may receive a first gesture input associated with rotating up the spherical interface of the virtual content organizer from the first pose to the second pose. The XR display device 102 may receive another first gesture input associated with rotating down the spherical interface of the virtual content organizer from the first pose to the second pose.

FIG. 7B illustrates another example manipulation of the virtual content organizer from the first pose to the second pose. The XR display device 102 may receive another first gesture input associated with rotating right the spherical interface of the virtual content organizer from the first pose to the second pose. The XR display device 102 may receive another first gesture input associated with rotating left the spherical interface of the virtual content organizer from the first pose to the second pose.

Figure 7D:
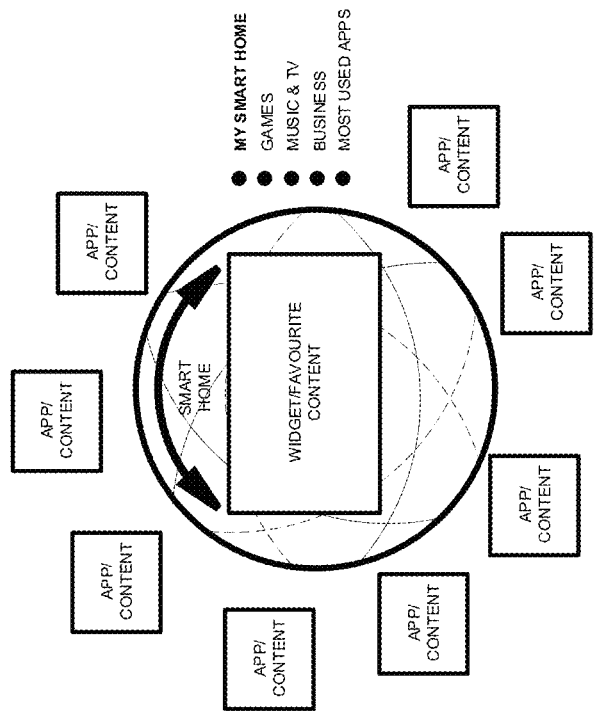
FIG. 7D illustrates another example manipulation of the virtual content organizer from the first pose to the second pose.
Figure 7C:
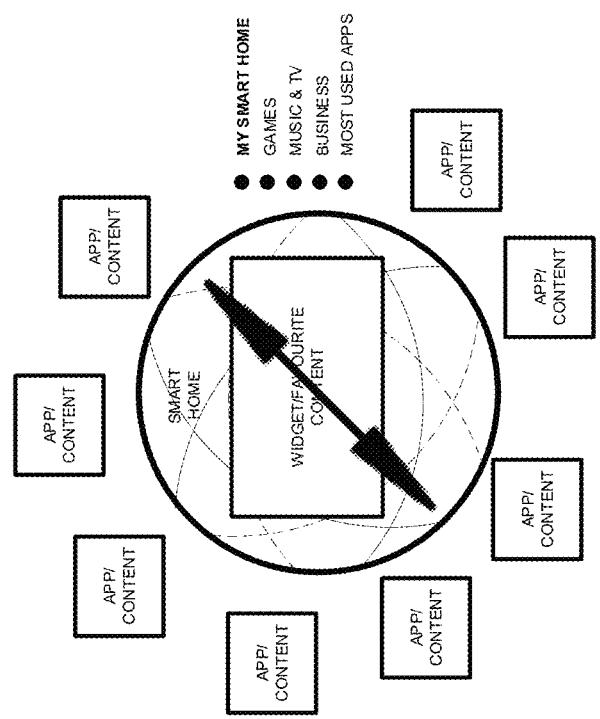
FIG. 7C illustrates another example manipulation of the virtual content organizer from the first pose to the second pose.

FIG. 7C illustrates another example manipulation of the virtual content organizer from the first pose to the second pose. The XR display device 102 may receive another first gesture input associated with pushing in the spherical interface of the virtual content organizer from the first pose to the second pose. The XR display device 102 may receive another first gesture input associated with pulling out the spherical interface of the virtual content organizer from the first pose to the second pose.

FIG. 7D illustrates another example manipulation of the virtual content organizer from the first pose to the second pose. The XR display device 102 may receive another first gesture input associated with clockwise rotating the spherical interface of the virtual content organizer from the first pose to the second pose. The XR display device 102 may receive another first gesture input associated with counter-clockwise rotating the spherical interface of the virtual content organizer from the first pose to the second pose.

Figure 7F:
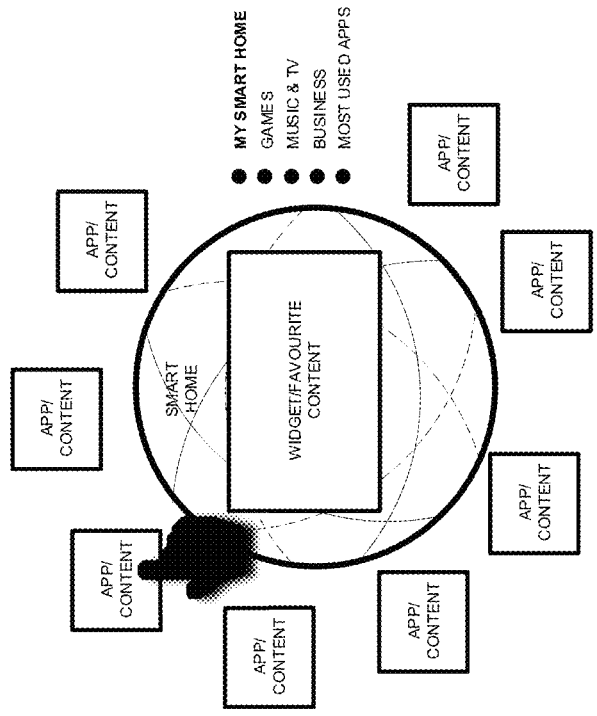
FIG. 7F illustrates another example manipulation of the virtual content organizer from the first pose to the second pose.
Figure 7E:
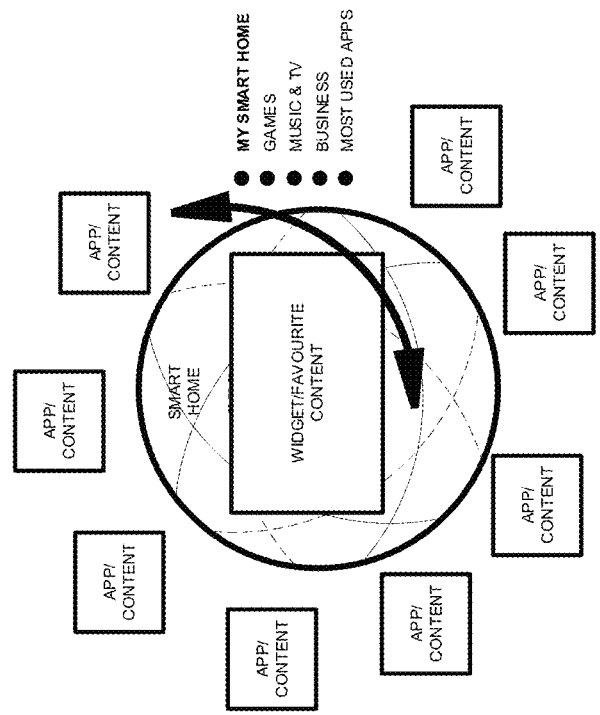
FIG. 7E illustrates another example manipulation of the virtual content organizer from the first pose to the second pose.

FIG. 7E illustrates another example manipulation of the virtual content organizer from the first pose to the second pose. The XR display device 102 may receive another first gesture input associated with diagonally rotating the spherical interface of the virtual content organizer from the first pose to the second pose.

FIG. 7F illustrates another example manipulation of the virtual content organizer from the first pose to the second pose. The XR display device 102 may receive another first gesture input associated with selecting a particular content of the spherical interface of the virtual content organizer. XR display device 102 may transform from the first pose to the second pose and render the second sequence of image frames of the XR environment from the first pose to the second pose. The second sequence of image frames may correspond to the particular content.

In particular embodiments, the XR display device 102 may receive one or more second gesture inputs associated with a second manipulation of one or more of the plurality of user-interactable elements from the first pose to the second pose. The second manipulation may comprise one or more of scrolling the one or more of the plurality of user-interactable elements, adding the one or more of the plurality of user-interactable elements, removing the one or more of the plurality of user-interactable elements, translating the one or more of the plurality of user-interactable elements, rotating the one or more of the plurality of user-interactable elements, or resizing the one or more of the plurality of user-interactable elements. As used herein, "second gesture inputs" may refer to another set of gestures (e.g., point, tap, throw, drag, swipe, wave, etc.) programmed to manipulate user-interactable elements from the first pose to the second pose. In particular embodiments, the second gesture inputs to manipulate the one or more of the plurality of user-interactable elements from the first pose to the second pose may overlap with the first gesture associated with manipulating the virtual content organizer along one or more of the six degrees of freedom from the first pose to a second pose. The XR display device 102 may receive one gesture associated with both the first manipulation of the virtual content organizer along one or more of the six degrees of freedom from the first pose to a second pose and the second manipulation of one or more of the plurality of user-interactable elements from the first pose to the second pose, at the same time. As an example and not by way of limitation, the XR display device 102 may receive a gesture from the first gesture inputs rotating up the virtual content organizer content spherical interface. The same gesture from the second gesture inputs is programmed to scroll up user-interactable elements 410 (e.g., categories) as depicted in FIG. 4. As an example and not by way of limitation, the XR display device 102 may receive another gesture that belongs to the first gesture inputs for rotating right the spherical interface of the virtual content organizer content, the same another gesture that belongs to the second gesture inputs is programmed to add more content and application type user-interactable elements 420 (e.g., application) under user-interactable element 412 (e.g., a selected category) as depicted in FIG. 4.

In particular embodiments, the XR display device 102 may receive a selection of a particular user-interactable element from the second subset of user-interactable elements, wherein the particular user-interactable element corresponds to a particular operation of the first plurality of operations. As an example and not by way of limitation, the XR display device 102 may receive a selection by receiving a gesture input of the desired application (e.g., pointing on an application icon of a particular music application). The user may select desired application (e.g., a particular music application) from a group of applications and contents displayed by XR display device 102 in the second pose of the virtual content organizer. The desired application being selected corresponds to a particular operation. For example, if the desired application being selected is a music application, the music application corresponds to playing the latest song list accessed by the user of the music application. Although this disclosure describes receiving a selection of a particular user-interactable element in a particular manner, this disclosure contemplates receiving a selection of a particular user-interactable element in any suitable manner.

In particular embodiments, the XR display device 102 may execute the particular operation. The XR display device 102 executing the particular operation may comprise at least one of launching the selected content or application and executing any operations related to the selected content or application. As an example and not by way of limitation, the XR display device 102 may render a particular game scene if the particular game application is selected. As another example and not by way of limitation, the XR display device 102 may retrieve a full version of an article if a particular content comprises a title and an introduction of that article is selected. The XR display device 102 may launch the select content or application occupying the entire XR environment or a partial XR environment. Although this disclosure describes executing the particular operation in a particular manner, this disclosure contemplates executing the particular operation in any suitable manner.

In particular embodiments, the XR display device 102 may, in response to executing the particular operation, render, for the one or more displays of the XR display device, a third sequence of image frames of the XR environment. The third sequence of images may portray the virtual content organizer being reduced to a launcher icon in the XR environment. The launcher icon is user-interactable with a second plurality of operations. As used herein, "second plurality of operations" may refer to operations that may be executed by the XR display device at a launcher status of the virtual content organizer. The user may turn on the launcher status of the virtual content organizer once the organizer is reduced to a launcher icon. The XR display device may enable the second plurality of operations while a selected content or application is in flight. As an example and not by way of limitation, the XR display device 102 may enable using the launcher icon to respond to messages or calls while inside a gaming environment. As another example and not by way of limitation, the XR display device 102 may enable using the launcher icon to open a user manual while manipulating a model representation of industrial equipment. Although this disclosure describes multitasking in the XR environment using the reduced virtual content organizer in a particular manner, this disclosure contemplates multitasking in the XR environment using the reduced virtual content organizer in any suitable manner. In particular embodiments, the launcher icon may be selectable by, received by the XR display device 102, user inputs such as voice input or gesture input (e.g., tap the icon, drag the icon to the middle, etc.). The XR display device 102 may locate the launcher icon anywhere within the XR environment. The user may access the launcher icon at any time to relaunch the extended virtual content organizer. The launcher icon may be two-dimensional or three-dimensional.

Figure 8A:
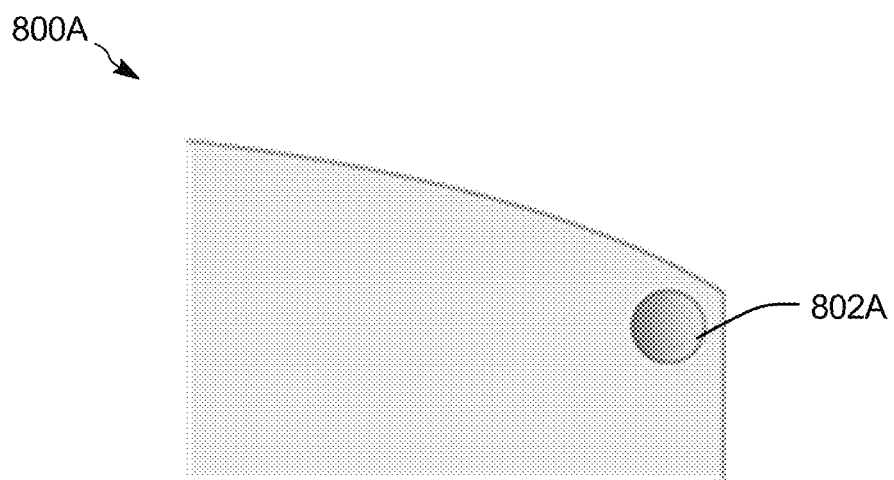
FIG. 8A illustrates an example launcher icon in the XR environment of the virtual content organizer.

FIG. 8A illustrates an example launcher icon in the XR environment of the virtual content organizer. The virtual content organizer may be reduced to the launcher icon 802A. The XR display device 102 may place the reduced launcher icon 802A in the upper right corner of the XR environment 800A.

Figure 8B:
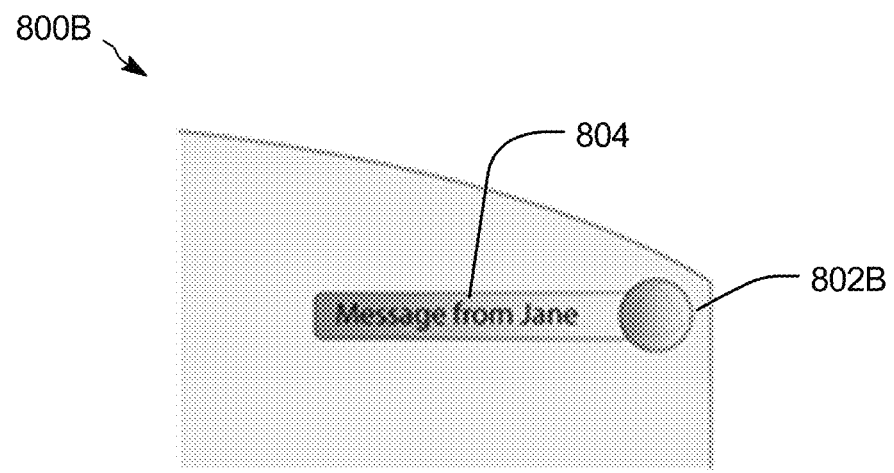
FIG. 8B illustrates an example interacting with the launcher icon.

FIG. 8B illustrates an example interacting with the launcher icon. In the XR environment 800B, the XR display device 102 enables the launcher icon 802B to receive and respond to message 804.

In particular embodiments, the XR display device 102 may render, for the one or more displays of the XR display device 102, a fourth sequence of image frames of the XR environment, wherein the fourth sequence of images portrays the virtual content organizer being divided into a plurality of sub-organizers, wherein the sub-organizers are approximately spherical. The virtual content organizer may be divided into several sub-virtual content organizers according to categories defined in the original virtual content organizer. The XR display device 102 may portray each sub-organizer with more precise sub-categories. The user may manipulate each sub-organizer may individually. As an example and not by way of limitation, the XR display device 102 may render a fourth sequence of image frames of the XR environment that portrays sub-organizers comprising game sub-organizer, business sub-organizer, music sub-organizer, etc.

In particular embodiments, the user may navigate the plurality of user-interactable elements according to a plurality of criteria, wherein each criterion for navigating the user-interactable elements corresponds to a particular manipulation along the one or more of the six degrees of freedom, wherein the plurality of criteria comprises one or more of numeric navigation, alphabetical navigation, category-based navigation, time-based navigation, or location-based navigation. The user may discover multiple criteria (e.g., numerical, alphabetical, category-based, time-based, location-based, etc.) with the multi-directional movement and rotation of the spherical interface. User-interactable elements may contain parameters (e.g., numerical, alphabetical, category-based, time-based, location-based, etc.) that may be assigned by the user or by the XR display device 102 to six degrees of freedom. As an example and not by way of limitation, the XR display device 102 may navigate user-interactable elements with time-based navigation by assigning time parameters to one of the six degrees of freedom (e.g., clockwise rotation and counterclockwise rotation). Under such circumstances, when manipulating the virtual content organizer to rotate clockwise or counterclockwise, the XR display device 102 may discover multiple time parameters. The user may access the application/content associated with the time parameters accordingly. Although this disclosure describes user-interactable elements may be navigated according to a plurality of criteria, this disclosure contemplates user-interactable elements may be navigated according to a plurality of criteria in any suitable manner.

Figure 9:
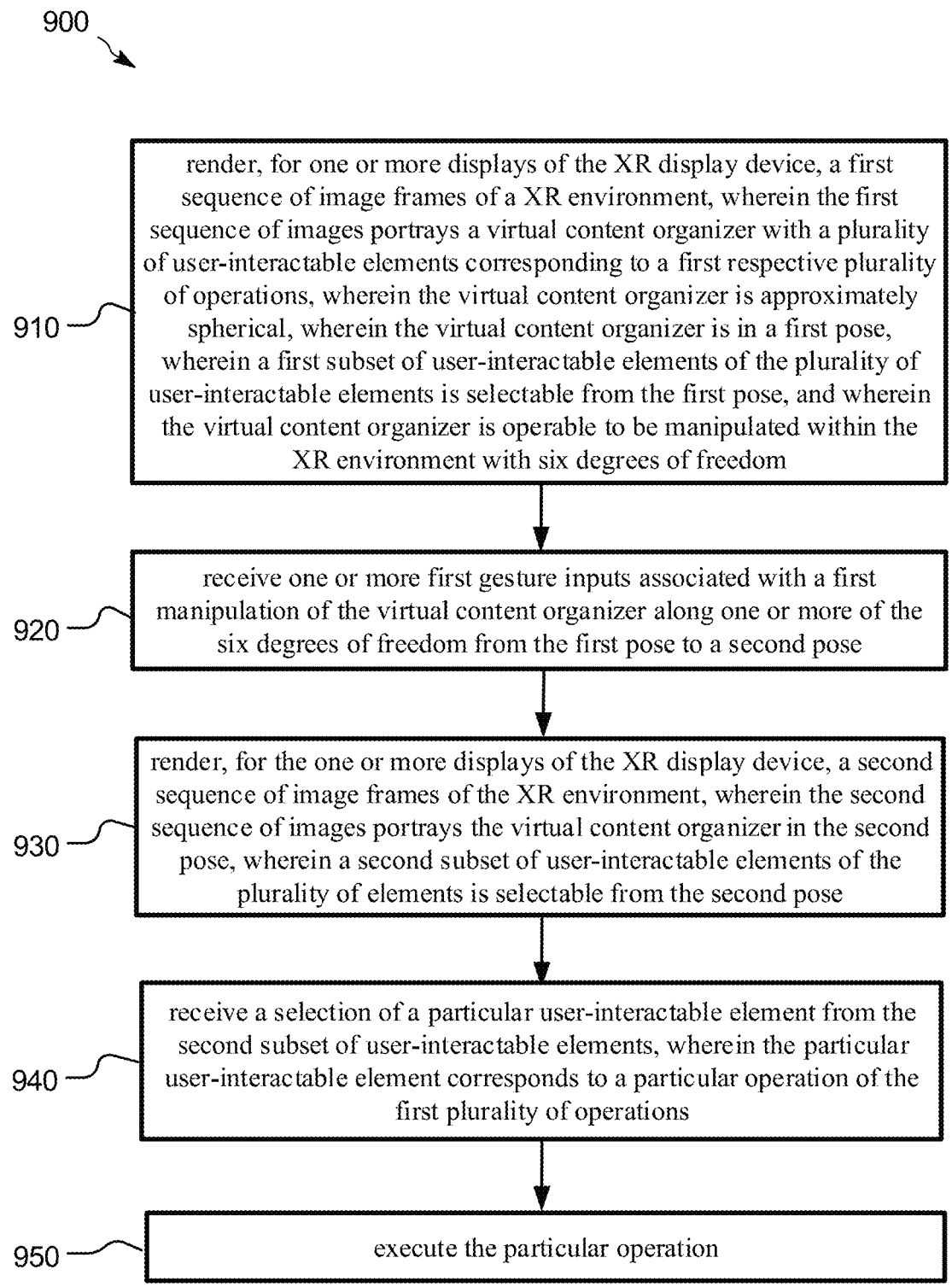
FIG. 9 illustrates an example method for organizing contents in the XR environment.

FIG. 9 illustrates a flow diagram of a method for organizing contents in XR environments, in accordance with the presently disclosed embodiments. The method 900 may be performed utilizing one or more processing devices (e.g., XR display device 102) that may include hardware (e.g., a general-purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 900 may begin at step 910 with the one or more processing devices (e.g., XR display device 102). For example, in particular embodiments, the XR display device 102 may render for one or more displays of the XR display device, a first sequence of image frames of a XR environment, wherein the first sequence of images portrays a virtual content organizer with a plurality of user-interactable elements corresponding to a first respective plurality of operations, wherein the virtual content organizer is approximately spherical, wherein the virtual content organizer is in a first pose, wherein a first subset of user-interactable elements of the plurality of user-interactable elements is selectable from the first pose, wherein the virtual content organizer is operable to be manipulated within the XR environment with six degrees of freedom, and wherein the plurality of user-interactable elements can be navigated according to a plurality of criteria, wherein each criterion for navigating the user-interactable elements corresponds to a particular manipulation along the one or more of the six degrees of freedom, wherein the plurality of criteria comprises one or more of numeric navigation, alphabetical navigation, category-based navigation, time-based navigation, or location-based navigation.

The method 900 may then continue at step 920 with the one or more processing devices (e.g., XR display device 102). For example, in particular embodiments, the XR display device 102 may receive one or more first gesture inputs associated with a first manipulation of the virtual content organizer along one or more of the six degrees of freedom from the first pose to a second pose, wherein the first manipulation of the virtual content organizer along one or more of the six degrees of freedom from the first pose to the second pose comprises one or more of translating the virtual content organizer, rotating the virtual content organizer, or resizing the virtual content organizer.

The method 900 may then continue at step 930 with the one or more processing devices (e.g., XR display device 102). For example, in particular embodiments, the XR display device 102 may render, for the one or more displays of the XR display device, a second sequence of image frames of the XR environment, wherein the second sequence of images portrays the virtual content organizer in the second pose, wherein a second subset of user-interactable elements of the plurality of elements is selectable from the second pose.

The method 900 may then continue at block 940 with the one or more processing devices (e.g., XR display device 102). For example, in particular embodiments, the XR display device 102 may receive a selection of a particular user-interactable element from the second subset of user-interactable elements, wherein the particular user-interactable element corresponds to a particular operation of the first plurality of operations.

The method 900 may then continue at step 950 with the one or more processing devices (e.g., XR display device 102). For example, in particular embodiments, the XR display device 102 may execute the particular operation being corresponded to the selected particular user-interactable element. The method 900 may also continue at a further step (not shown in the figure) with the one or more processing devices (e.g., XR display device 102). For example, in an embodiment, responsive to executing the particular operation, the XR display device 102 may further render, for the one or more displays of the XR display device 102, a third sequence of image frames of the XR environment, wherein the third sequence of images portrays the virtual content organizer being reduced to a launcher icon in the XR environment, wherein the launcher icon is user-interactable with a second plurality of operations, wherein the launcher icon is selectable to relaunch the virtual content organizer. In another embodiment, the method 900 may also continue at another further step (not shown in the figure) with the one or more processing devices (e.g., XR display device 102). For example, the XR display device 102 may receive one or more second gesture inputs associated with a second manipulation of one or more of the plurality of user-interactable elements from the first pose to the second pose, wherein the second manipulation comprises one or more of scrolling the one or more of the plurality of user-interactable elements, adding the one or more of the plurality of user-interactable elements, removing the one or more of the plurality of user-interactable elements, translating the one or more of the plurality of user-interactable elements, rotating the one or more of the plurality of user-interactable elements, or resizing the one or more of the plurality of user-interactable elements.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for organizing contents in the XR environment including the particular steps of the method of FIG. 9, this disclosure contemplates any suitable method for organizing contents in the XR environment including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Systems and Methods

Figure 10:
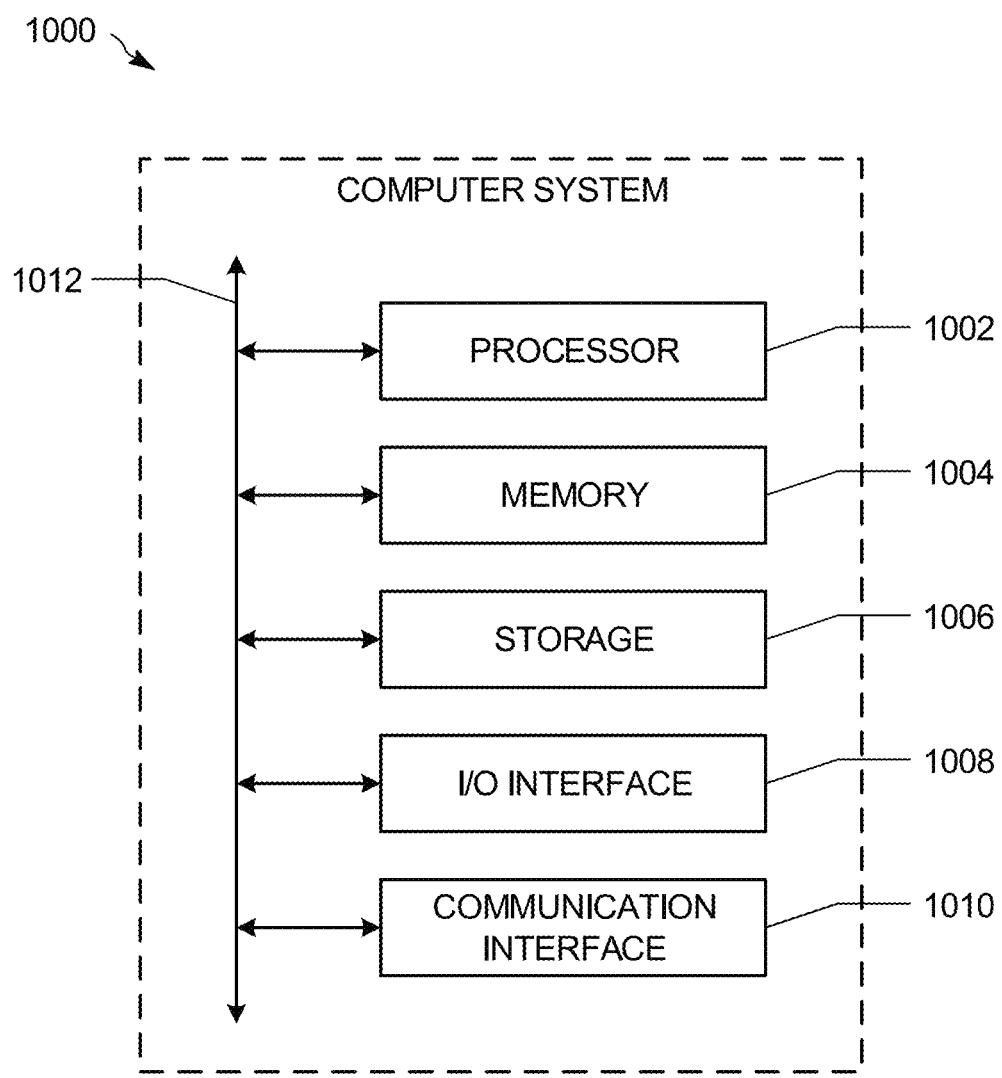
FIG. 10 illustrates an example computer system.

FIG. 10 illustrates an example computer system 1000 that may be utilized to perform organizing contents in an XR environment, in accordance with the presently disclosed embodiments. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As an example and not by way of limitation, computer system 1000 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks.

Where appropriate, one or more computer systems 1000 may perform without substantial spatial or temporal limitation one or more steps of one or more methods described or illustrated herein. As an example, and not by way of limitation, one or more computer systems 1000 may perform in real-time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement. In particular embodiments, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002.

Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere).

One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memory devices 1004, where appropriate. Although this disclosure describes and illustrates particular memory, this disclosure contemplates any suitable memory.

In particular embodiments, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate.

One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1006 for them. Where appropriate, I/O interface 1008 may include one or more device or software drivers enabling processor 1002 to drive one or more of these I/O devices. I/O interface 1008 may include one or more I/O interfaces 1006, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it.

As an example, and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example, and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

AI Architecture

Figure 11:
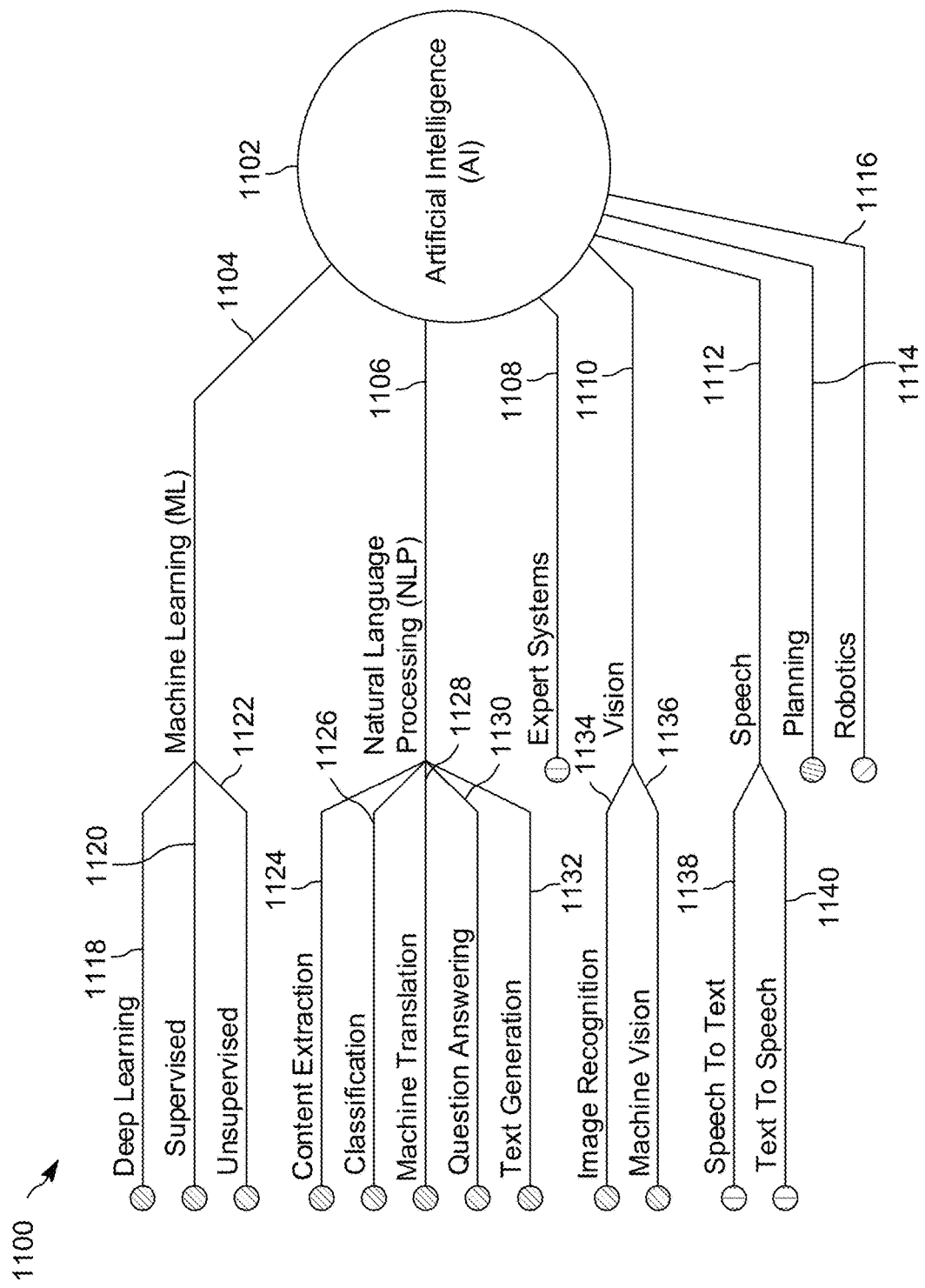
FIG. 11 illustrates a diagram of an example artificial intelligence (AI) architecture.

FIG. 11 illustrates a diagram 1100 of an example artificial intelligence (AI) architecture 1102 that may be utilized to perform organizing contents in an XR environment, in accordance with the presently disclosed embodiments. In particular embodiments, the AI architecture 1102 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 11, the AI architecture 1102 may include machine leaning (ML) algorithms and functions 1104, natural language processing (NLP) algorithms and functions 1106, expert systems 1108, computer-based vision algorithms and functions 1110, speech recognition algorithms and functions 1112, planning algorithms and functions 1114, and robotics algorithms and functions 1116. In particular embodiments, the ML algorithms and functions 1104 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 1104 may include deep learning algorithms 1118, supervised learning algorithms 1120, and unsupervised learning algorithms 1122.

In particular embodiments, the deep learning algorithms 1118 may include any artificial neural networks (ANNs) that may be utilized to learn deep levels of representations and abstractions from large amounts of data. For example, the deep learning algorithms 1118 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 1120 may include any algorithms that may be utilized to apply, for example, what has been learned in the past to new data using labeled examples for predicting future events. For example, starting from the analysis of a known training dataset, the supervised learning algorithms 1120 may produce an inferred function to make predictions about the output values. The supervised learning algorithms 1120 can also compare its output with the correct and intended output and find errors in order to modify the supervised learning algorithms 1120 accordingly. On the other hand, the unsupervised learning algorithms 1122 may include any algorithms that may applied, for example, when the data used to train the unsupervised learning algorithms 1122 are neither classified or labeled. For example, the unsupervised learning algorithms 1122 may study and analyze how systems may infer a function to describe a hidden structure from unlabeled data.

In particular embodiments, the NLP algorithms and functions 1106 may include any algorithms or functions that may be suitable for automatically manipulating natural language, such as speech and/or text. For example, in particular embodiments, the NLP algorithms and functions 1106 may include content extraction algorithms or functions 1124, classification algorithms or functions 1126, machine translation algorithms or functions 1128, question answering (QA) algorithms or functions 1130, and text generation algorithms or functions 1132. In particular embodiments, the content extraction algorithms or functions 1124 may include a means for extracting text or images from electronic documents (e.g., webpages, text editor documents, and so forth) to be utilized, for example, in other applications.

In particular embodiments, the classification algorithms or functions 1126 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 1128 may include any algorithms or functions that may be suitable for automatically converting source text in one language, for example, into text in another language. The QA algorithms or functions 1130 may include any algorithms or functions that may be suitable for automatically answering questions posed by humans in, for example, a natural language, such as that performed by voice-controlled personal assistant devices. The text generation algorithms or functions 1132 may include any algorithms or functions that may be suitable for automatically generating natural language texts.

In particular embodiments, the expert systems 1108 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 1110 may include any algorithms or functions that may be suitable for automatically extracting information from images (e.g., photo images, video images). For example, the computer-based vision algorithms and functions 1110 may include image recognition algorithms 1134 and machine vision algorithms 1136. The image recognition algorithms 1134 may include any algorithms that may be suitable for automatically identifying and/or classifying objects, places, people, and so forth that may be included in, for example, one or more image frames or other displayed data. The machine vision algorithms 1136 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 1112 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 1138 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 1140 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an extended reality (XR) display device:
    rendering, for one or more displays of the XR display device, a first sequence of image frames of an XR environment, wherein the first sequence of image frames portrays a virtual content organizer with a plurality of user-interactable elements corresponding to a first respective plurality of operations, wherein the virtual content organizer is spherically shaped, wherein the virtual content organizer is in a first pose, wherein a first subset of user-interactable elements of the plurality of user-interactable elements is selectable from the first pose, and wherein the virtual content organizer is operable to be manipulated within the XR environment with six degrees of freedom, wherein manipulations along the one or more of the six degrees of freedom correspond to a plurality of criteria for navigating the plurality of user-interactable elements;
    receiving one or more first gesture inputs associated with a first manipulation of the virtual content organizer along one or more of the six degrees of freedom from the first pose to a second pose;
    rendering, for the one or more displays of the XR display device, a second sequence of image frames of the XR environment, wherein the second sequence of image frames portrays the virtual content organizer in the second pose, wherein a second subset of user-interactable elements of the plurality of elements is selectable from the second pose;
    receiving a selection of a particular user-interactable element from the second subset of user-interactable elements, wherein the particular user-interactable element corresponds to a particular operation of the first respective plurality of operations; and
    executing the particular operation.

2. The method of claim 1, further comprising:
    responsive to executing the particular operation, rendering, for the one or more displays of the XR display device, a third sequence of image frames of the XR environment, wherein the third sequence of image frames portrays the virtual content organizer being reduced to a launcher icon in the XR environment, wherein the launcher icon is user-interactable with a second plurality of operations.

3. The method of claim 2, wherein the launcher icon is selectable to relaunch the virtual content organizer.

4. The method of claim 1, further comprising:
    rendering, for the one or more displays of the XR display device, a fourth sequence of image frames of the XR environment, wherein the fourth sequence of image frames portrays the virtual content organizer being divided into a plurality of sub-organizers, wherein the sub-organizers are approximately spherical.

5. The method of claim 1, wherein the plurality of criteria comprises one or more of:
    numeric navigation,
    alphabetical navigation,
    category-based navigation,
    time-based navigation, or
    location-based navigation.

6. The method of claim 1, wherein the first manipulation of the virtual content organizer along one or more of the six degrees of freedom from the first pose to the second pose comprises one or more of:
    translating the virtual content organizer,
    rotating the virtual content organizer, or
    resizing the virtual content organizer.

7. The method of claim 1, further comprising:
    receiving one or more second gesture inputs associated with a second manipulation of one or more of the plurality of user-interactable elements from the first pose to the second pose, wherein the second manipulation comprises one or more of:
        scrolling the one or more of the plurality of user-interactable elements,
        adding the one or more of the plurality of user-interactable elements,
        removing the one or more of the plurality of user-interactable elements,
        translating the one or more of the plurality of user-interactable elements,
        rotating the one or more of the plurality of user-interactable elements, or
        resizing the one or more of the plurality of user-interactable elements.

8. An electronic device comprising:
    one or more displays;
    one or more non-transitory computer-readable storage media including instructions; and
    one or more processors coupled to the storage media, the one or more processors configured to execute the instructions to:
        render, for one or more displays of the XR display device, a first sequence of image frames of a XR environment, wherein the first sequence of image frames portrays a virtual content organizer with a plurality of user-interactable elements corresponding to a first respective plurality of operations, wherein the virtual content organizer is spherically shaped, wherein the virtual content organizer is in a first pose, wherein a first subset of user-interactable elements of the plurality of user-interactable elements is selectable from the first pose, and wherein the virtual content organizer is operable to be manipulated within the XR environment with six degrees of freedom, wherein manipulations along the one or more of the six degrees of freedom correspond to a plurality of criteria for navigating the plurality of user-interactable elements;
receive one or more first gesture inputs associated with a first manipulation of the virtual content organizer along one or more of the six degrees of freedom from the first pose to a second pose;
render, for the one or more displays of the XR display device, a second sequence of image frames of the XR environment, wherein the second sequence of image frames portrays the virtual content organizer in the second pose, wherein a second subset of user-interactable elements of the plurality of elements is selectable from the second pose;
receive a selection of a particular user-interactable element from the second subset of user-interactable elements, wherein the particular user-interactable element corresponds to a particular operation of the first respective plurality of operations; and
execute the particular operation.

9. The electronic device of claim 8, wherein the processors are further configured to execute the instructions to:
responsive to executing the particular operation, render, for the one or more displays of the XR display device, a third sequence of image frames of the XR environment, wherein the third sequence of image frames portrays the virtual content organizer being reduced to a launcher icon in the XR environment, wherein the launcher icon is user-interactable with a second plurality of operations.

10. The electronic device of claim 9, wherein the launcher icon is selectable to relaunch the virtual content organizer.

11. The electronic device of claim 8, wherein the processors are further configured to execute the instructions to:
render, for the one or more displays of the XR display device, a fourth sequence of image frames of the XR environment, wherein the fourth sequence of image frames portrays the virtual content organizer being divided into a plurality of sub-organizers, wherein the sub-organizers are approximately spherical.

12. The electronic device of claim 8, wherein the plurality of criteria comprises one or more of:
numeric navigation,
alphabetical navigation,
category-based navigation,
time-based navigation, or
location-based navigation.

13. The electronic device of claim 8, wherein the first manipulation of the virtual content organizer along one or more of the six degrees of freedom from the first pose to the second pose comprises one or more of:
translating the virtual content organizer,
rotating the virtual content organizer, or
resizing the virtual content organizer.

14. The electronic device of claim 8, wherein the processors are further configured to execute the instructions to:
receive one or more second gesture inputs associated with a second manipulation of one or more of the plurality of user-interactable elements from the first pose to the second pose, wherein the second manipulation comprises one or more of:
scrolling the one or more of the plurality of user-interactable elements,
adding the one or more of the plurality of user-interactable elements,
removing the one or more of the plurality of user-interactable elements,
translating the one or more of the plurality of user-interactable elements,
rotating the one or more of the plurality of user-interactable elements, or
resizing the one or more of the plurality of user-interactable elements.

15. A computer-readable non-transitory storage media comprising instructions executable by a processor to:
render, for one or more displays of the XR display device, a first sequence of image frames of a XR environment, wherein the first sequence of image frames portrays a virtual content organizer with a plurality of user-interactable elements corresponding to a first respective plurality of operations, wherein the virtual content organizer is spherically shaped, wherein the virtual content organizer is in a first pose, wherein a first subset of user-interactable elements of the plurality of user-interactable elements is selectable from the first pose, and wherein the virtual content organizer is operable to be manipulated within the XR environment with six degrees of freedom, wherein manipulations along the one or more of the six degrees of freedom correspond to a plurality of criteria for navigating the plurality of user-interactable elements;
receive one or more first gesture inputs associated with a first manipulation of the virtual content organizer along one or more of the six degrees of freedom from the first pose to a second pose;
render, for the one or more displays of the XR display device, a second sequence of image frames of the XR environment, wherein the second sequence of image frames portrays the virtual content organizer in the second pose, wherein a second subset of user-interactable elements of the plurality of elements is selectable from the second pose;
receive a selection of a particular user-interactable element from the second subset of user-interactable elements, wherein the particular user-interactable element corresponds to a particular operation of the first respective plurality of operations; and
execute the particular operation.

16. The media of claim 15, wherein the instructions are further executable by the processor to:
responsive to executing the particular operation, render, for the one or more displays of the XR display device, a third sequence of image frames of the XR environment, wherein the third sequence of image frames portrays the virtual content organizer being reduced to a launcher icon in the XR environment, wherein the launcher icon is user-interactable with a second plurality of operations.

17. The media of claim 15, wherein the instructions are further executable by the processor to:
render, for the one or more displays of the XR display device, a fourth sequence of image frames of the XR environment, wherein the fourth sequence of image frames portrays the virtual content organizer being divided into a plurality of sub-organizers, wherein the sub-organizers are approximately spherical.

18. The media of claim 15, wherein the plurality of criteria comprises one or more of:
numeric navigation,
alphabetical navigation,
category-based navigation,
time-based navigation, or
location-based navigation.

19. The media of claim 15, wherein the first manipulation of the virtual content organizer along one or more of the six degrees of freedom from the first pose to the second pose comprises one or more of:
- translating the virtual content organizer,
- rotating the virtual content organizer, or
- resizing the virtual content organizer.

20. The media of claim 15, wherein the instructions are further executable by the processor to:
- receive one or more second gesture inputs associated with a second manipulation of one or more of the plurality of user-interactable elements from the first pose to the second pose, wherein the second manipulation comprises one or more of:
  - scrolling the one or more of the plurality of user-interactable elements,
  - adding the one or more of the plurality of user-interactable elements,
  - removing the one or more of the plurality of user-interactable elements,
  - translating the one or more of the plurality of user-interactable elements,
  - rotating the one or more of the plurality of user-interactable elements, or
  - resizing the one or more of the plurality of user-interactable elements.

* * * * *